United States Patent [19]

Hayase et al.

[11] 4,406,764

[45] Sep. 27, 1983

[54] PHOTO-CURABLE EPOXY RESIN COMPOSITION WITH ORGANIC ALUMINUM AND α-KETOSILYL COMPOUNDS

[75] Inventors: Syuzi Hayase, Yokohama; Takeo Ito, Kawasaki, both of Japan

[73] Assignee: Tokyo Shibaura Denki Kabushiki Kaisha, Kawasaki, Japan

[21] Appl. No.: 341,827

[22] Filed: Jan. 22, 1982

[30] Foreign Application Priority Data

Jan. 27, 1981 [JP]  Japan ................................. 56-9670

[51] Int. Cl.³ .......................... C08F 2/50; C08G 59/68
[52] U.S. Cl. ................................. 204/159.11; 528/92; 556/436
[58] Field of Search .................... 528/92; 556/436; 204/159.11

[56] References Cited

U.S. PATENT DOCUMENTS

| | | | |
|---|---|---|---|
| 2,634,282 | 4/1953 | Sommer | 556/436 |
| 2,775,605 | 12/1956 | De Benneville et al. | 556/436 |
| 3,489,781 | 1/1970 | Wilkus | 556/436 |
| 4,009,128 | 2/1977 | Wandenberg | 528/92 |
| 4,069,054 | 1/1978 | Smith | 96/115 P |
| 4,081,276 | 3/1978 | Crivello | 204/159.18 |
| 4,086,091 | 4/1978 | Cella | 528/92 |
| 4,297,458 | 10/1981 | Stark | 528/92 |
| 4,322,513 | 3/1982 | Wada et al. | 528/92 |
| 4,324,873 | 4/1982 | Wada et al. | 528/92 |
| 4,335,367 | 6/1982 | Mitsui et al. | 528/92 |

FOREIGN PATENT DOCUMENTS 1516511  7/1978  United Kingdom.
1526923  10/1978  United Kingdom.

OTHER PUBLICATIONS

Brook et al.; Journal Amer. Chem. Soc. 85, No. 6, Mar. 1963, pp. 832–833.
Brook et al.; Canadian Journal of Chem. 41, No. 9, Sep. 1963, pp. 2351–2356.
Brook et al.; Canadian Journal of Chem. 42, No. 1, Jan. 1964, pp. 298–304.
Brook et al.; Canadian Journal of Chem. 49, No. 10, May 1971, pp. 1622–1628.
European Search Report.

*Primary Examiner*—Melvyn I. Marquis
*Assistant Examiner*—A. H. Koeckert
*Attorney, Agent, or Firm*—Schwartz, Jeffery, Schwaab, Mack, Blumenthal & Koch

[57] ABSTRACT

Disclosed is a photo-curable epoxy resin composition which comprises an epoxy resin and a combination of an aluminum compound and an α-ketosilyl compound as a catalyst.

13 Claims, No Drawings

PHOTO-CURABLE EPOXY RESIN COMPOSITION WITH ORGANIC ALUMINUM AND α-KETOSILYL COMPOUNDS

BACKGROUND OF THE INVENTION

This invention relates to a photo-curable epoxy resin composition, and more particularly to a photo-curable epoxy resin composition which has improved curing and electric characteristics and which is suitable for use as insulating and resist materials in electric equipment.

Recently, processes for hardening the resins by use of light are attracting attention to save energy and improve operating efficiency in the field of resins. Among others, processes for photo-curing epoxy resins are regarded as important because of the wide range of their possible applications. In the photocurable processes for epoxy resins, the compositions of epoxy resins themselves are very important, besides the curing conditions. Thus various compounding compositions of epoxy resins have broadly been studied. To date, two types of photo-curable epoxy resin compositions have been known; one is an epoxy resin which is modified by the addition of a photo-polymerizable compound containing the double bond or bonds, such as acrylic acid and its derivatives, and the other is a composition containing the photo-decomposing type catalysts such as those having the formula $\phi_3S^\oplus PF_6^\ominus$ or $\phi_2X^\oplus BF_4^\ominus$ in which $\phi$ represents a phenyl group and X represents a halogen [Japanese Patent Publication Nos. 14277/1977, 14278/1977 and 14279/1977; Japanese Provisional Patent Publication Nos. 95686/1979, 125104/1980 and 125105/1980, and U.S. Pat. No. 4,081,276]. Photo-cured products obtained from the former type, i.e., modified epoxy resins, show heat resistance considerably inferior to that of photo-cured products obtained from epoxy resins themselves. On the other hand, the latter type, i.e., the epoxy resin compositions containing the photo-decomposing type catalysts, give photo-cured products which show good mechanical and thermal characteristics. In this case, however, the catalyst components remain as ionic impurities in the photo-cured products, adversely affecting the electric characteristics thereof. In addition, when such photo-cured products containing the ionic impurities are used in electric equipment, the ionic impurities sometimes cause the electric equipment to corrode.

SUMMARY OF THE INVENTION

An object of the present invention is to provide a photo-curable epoxy resin composition which gives a cured product having excellent mechanical and thermal characteristics and containing no ionic impurities, thereby eliminating the disadvantages of the conventional photo-curable epoxy resin compositions described above.

The epoxy resin composition according to the present invention comprises an epoxy resin and a combination of an aluminum compound and an α-ketosilyl compound as a catalyst. Preferably, the epoxy resin composition further contains an active proton-containing compound.

DETAILED DESCRIPTION OF PREFERRED EMBODIMENTS

The term "epoxy resin" used herein broadly means an epoxy compound alone; a system comprising an epoxy compound and a curing agent therefor (acid anhydrides, phenolic compounds, etc.); and an epoxy compound or a system comprising an epoxy compound and a curing agent therefor, in which there is added, e.g., an unsaturated bond-containing compound such as ethylenic compound, imide compound or the like.

Examples of epoxy compounds which may be used in accordance with the present invention are bisphenol A type epoxy resins, bisphenol F type epoxy resins, phenol-novolak type epoxy resins, cycloaliphatic epoxy resins, heterocyclic ring-containing epoxy resins such as triglycidyl isocyanurate and hydantoin epoxy, hydrogenated bisphenol A type epoxy resins, aliphatic epoxy resins such as propylene glycol diglycidyl ether and pentaerythritol polyglycidyl ethers, glycidyl ester type epoxy resins obtained by the reaction of an aromatic, aliphatic or cycloaliphatic carboxylic acid with epichlorohydrin, spiro-ring containing epoxy resins, glycidyl ether type epoxy resins obtained by the reaction of an ortho-allylphenol novolak compound with epichlorohydrin, glycidyl ether type epoxy resins obtained by the reaction of epichlorohydrin with a diallyl bisphenol compound having an allyl group at the ortho-position with respect to each hydroxyl group of bisphenol A, and the like.

Acid anhydrides which may be used as curing agents for the epoxy compounds in accordance with the present invention include phthalic anhydride, hexahydrophthalic anhydride, tetrahydrophthalic anhydride, methyltetrahydrophthalic anhydride, methylhexahydrophthalic anhydride, nadic anhydride, methylnadic anhydride, chlorendic anhydride, dodecenylsuccinic anhydride, methylsuccinic anhydride, benzophenonetetracarboxylic anhydride, pyromellitic anhydride, maleic anhydride and the like. These acid anhydrides are used in an amount of 1.0 equivalent or less based on the epoxy compounds.

The phenolic compounds which may be added to the epoxy resins in accordance with the present invention may, for example, be bisphenol A, bisphenol F, bisphenol S, and condensates of formaldehyde and like with phenols such as phenol, cresol and bisphenol A. These phenolic compounds are preferably used in an amount of 0.8 equivalent or less based on the epoxy compounds.

Ethylenic compounds which may be used in accordance with the present invention include unsaturated carboxylic acids, unsaturated carboxylic acid salts, esters obtained from unsaturated carboxylic acids and aliphatic polyhydroxy compounds (hereinafter referred to as aliphatic polyols) or aromatic polyhydroxy compounds (hereinafter referred to as polyhydric phenols), oligo-esters obtained by the esterification from di- or higher polybasic carboxylic acids, di- or higher polyhydroxy compounds and unsaturated carboxylic acids, and the like.

The unsaturated carboxylic acids described above may, for example, be acrylic acid, methacrylic acid, itaconic acid, crotonic acid, isocrotonic acid, maleic acid, and the like.

The aliphatic polyols described above may be, e.g., dihydric alcohols such as ethylene glycol, triethylene glycol, tetraethylene glycol, tetramethylene glycol, neopentyl glycol, 1,10-decanediol, 1,2-butanediol, 1,3-butanediol, propylenediol, and propylene glycol; trihydric alcohols and their polymers, such as trimethylol ethane, and trimethylol propane; tetra- or higher alcohols such as pentaerythritol, dipentaerythritol, tripentaerythritol and other polymeric pentaerythritols, sugars such as sorbitol and di-mannitol; and dihydroxycarboxylic acids such as dihydroxymaleic acid.

The polyhydric phenols described above may, e.g., be hydroquinone, catechol, resorcinol, phloroglucinol and pyrogallol.

The above-mentioned esters of aliphatic polyols and unsaturated carboxylic acids may, e.g., be acrylic acid esters such as ethylene glycol diacrylate, triethylene glycol triacrylate, 1,3-butanediol diacrylate, tetramethylene glycol diacrylate, propylene glycol diacrylate, trimethylol propane triacrylate, trimethylol ethane triacrylate, tetraethylene glycol diacrylate, pentaerythritol diacrylate, pentaerythritol triacrylate, pentaerythritol tetraacrylate, dipentaerythritol diacrylate, dipentaerythritol triacrylate, dipentaerythritol tetraacrylate, dipentaerythritol pentaacrylate, dipentaerythritol hexaacrylate, tripentaerythritol octaacrylate, dipentaerythritol tetraacrylate, dipentaerythritol pentaacrylate, dipentaerythritol hexaacrylate, tripentaerythritol octaacrylate, sorbitol triacrylate, sorbitol tetraacrylate, sorbitol pentaacrylate, sorbitol hexaacrylate, polyester acrylate oligomers and the like. The above-mentioned esters of aliphatic polyols and unsaturated carboxylic acids may further be methacrylic acid esters such as, e.g., tetramethylene glycol dimethacrylate, triethylene glycol dimethacrylate, trimethylol propane trimethacrylate, trimethylol ethane trimethacrylate, pentaerythritol dimethacrylate, pentaerythritol trimethacrylate, dipentaerythritol dimethacrylate, pentaerythritol dimethacrylate, pentaerythritol trimethacrylate, dipentaerythritol dimethacrylate, dipentaerythritol tetramethacrylate, tripentaerythritol octamethacrylate, ethylene glycol dimethacrylate, 1,3-butanedioldimethacrylate, tetramethylene glycol dimethacrylate, and sorbitol tetramethacrylate. Further, the above-mentioned esters may be itaconic acid esters such as, e.g., ethylene glycol diitaconate, propylene glycol diitaconate, 1,3-butanediol diitaconate, 1,4-butanediol diitaconate, tetramethylene glycol diitaconate, pentaerythritol diitaconate, dipentaerythritol triitaconate, dipentaerythritol pentaitaconate, dipentaerythritol hexaitaconate, and sorbitol tetraitaconate. Furthermore, the above-mentioned esters may be crotonic acid esters such as, e.g., ethylene glycol dicrotonate, propylene glycol dicrotonate, tetramethylene glycol dicrotonate, pentaerythritol dicrotonate, and sorbitol tetracrotonate. Moreover, the above-mentioned esters may be isocrotonic acid esters such as, e.g., ethylene glycol diisocrotonate, pentaerythritol diisocrotonate, and sorbitol tetraisocrotonate. Examples of the above-mentioned esters also include maleic acid esters such as, e.g., ethylene glycol dimaleate, triethylene glycol dimaleate, pentaerythritol dimaleate, and sorbitol tetramaleate. Mixtures of these esters may also be used.

Examples of the above-mentioned oligo-esters include oligo-ester acrylates and oligo-ester methacrylates (both or either of them are hereinafter referred to as oligo-ester (meth)acrylates).

The oligo-ester (meth)acrylates are the reaction products obtained by the esterification of acrylic acid or methacrylic acid, polybasic carboxylic acids and polyols and have the following presumable general formula:

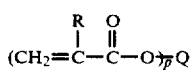

in which R represents a hydrogen atom or a methyl group, Q represents an ester residue which is formed by a polyol and a polybasic carboxylic acid and which contains at least one ester bond, and p represents an integer of from 1 to 6.

Examples of polyols constituting the ester residue Q include polyols such as, e.g., ethylene glycol, 1,2-propylene glycol, 1,4-butanediol, 1,6-hexanediol, trimethylol propane, trimethylol ethane, 1,2,6-hexanetriol, glycerin, pentaerythritol, and sorbitol; and polyether polyols such as, e.g., diethylene glycol, triethylene glycol, tetraethylene glycol, decaethylene glycol, tetradecaethylene glycol, polyethylene glycols, dipropylene glycol, tripropylene glycol, tetrapropylene glycol, and polypropylene glycols.

Polybasic carboxylic acids constituting the ester residue Q include aromatic polybasic carboxylic acids such as, e.g., phthalic acid, isophthalic acid, terephthalic acid, tetrachlorophthalic acid, tetrabromophthalic acid, trimellitic acid, pyromellitic acid, benzophenonedicarboxylic acid, resorcinol diacetate, bisphenol A diacetate; unsaturated aliphatic polybasic carboxylic acids such as, e.g., maleic acid, fumaric acid, himic acid, and itaconic acid; and saturated aliphatic polybasic carboxylic acids such as, e.g., malonic acid, succinic acid, glutaric acid, adipic acid, pimelic acid, sebacic acid, dodecanoic acid, and tetrahydrophthalic acid.

The unsaturated compounds which may be used in accordance with the present invention are preferably used in an amount of 0.6 equivalent or less based on the epoxy compounds.

Preferably, the imide compounds which may be used in accordance with the present invention are maleimides having the following general formula:

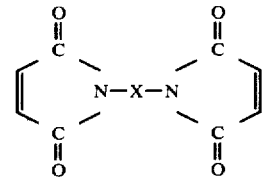

in which X represents a divalent hydrocarbon group such as, e.g., alkylene group, cycloalkylene group, and monocyclic or polycyclic arylene group; or a divalent hydrocarbon group combined with a divalent atomic group such as, e.g., —CH$_2$—, —CO—, —SO$_2$— or —CONH—. Examples of such maleimide compounds are N,N'-phenylenebismaleimide, N,N'-hexamethylenebismaleimide, N,N'-methylene-di-p-phenylenebismaleimide, N,N'-oxy-di-p-phenylenebismaleimide, N,N'-4,4'-benzophenone-bismaleimide, N,N'-p-diphenylsulfonmaleimide, N,N'-(3,3'-dimethyl)-methylene-di-p-phenylenebis-maleimide, N,N'-(3,3'-diethyl)-methylene-di-p-phenylenebismaleimide, and N,N'-metatoluylene-dimaleimide. These imide compounds are used in an amount of 0.5 equivalent or less based on the epoxy compounds.

The aluminum compounds used as one component according to the present invention are preferably organic aluminum compounds containing an organic group selected from the group consisting of an alkyl group, a phenyl group, a haloalkyl group, an alkoxy group, an acyl group, a phenoxy group, an acyloxy group, and β-dicarbonyl compound. These aluminum compounds may be used independently or in admixture with one another. They are generally used in an amount of 0.001 to 10% by weight, preferably 0.5 to 5% by weight based on the epoxy resins.

An amount of the aluminum compounds below 0.001% by weight cannot give sufficient curing characteristics, on the contrary an amount thereof in excess of 5% by weight can also be used, but would make cost of the compositions expensive and cause the electric characteristics to deteriorate.

The above-mentioned aluminum compounds may be, e.g., alkoxyaluminum compounds containing a methoxy, an ethoxy or an isopropoxy group or the like; aryloxyaluminum compounds containing a phenoxy or a p-methylphenoxy group or the like; acryloxyaluminum compounds based on acetates, stearates, butyrates, propionates, isopropionates or the like; and aluminum chelate compounds based on acetylacetone, trifluoroacetylacetone, pentafluoroacetylacetone, ethyl acetoacetate, salicylaldehyde, diethyl malonate or the like.

The concrete examples of the aluminum compounds include trimethoxyaluminum, triethoxyaluminum, triisopropoxyaluminum, triphenoxyaluminum, triparamethyl-phenoxyaluminum, isopropoxydiethoxyaluminum, tributoxyaluminum, triacetoxyaluminum, aluminum tristearate, aluminum tributyrate, aluminum tripropionate, aluminum isopropionate, trisacetylacetonatoaluminum, tris(trifluoroacetylacetonato) aluminum, tris(pentafluoroacetylacetonato) aluminum, aluminum trisethylacetoacetate, aluminum trissalicylaldehyde, aluminum tris(diethyl malonate), aluminum trispropylacetoacetate, aluminum trisbutylacetoacetate, tris(dipivaloylmethanato)aluminum, and diacetylacetonatodipivaloylmethanatoaluminum.

The α-ketosilyl compounds used as one component in accordance with the present invention preferably have the following general formula:

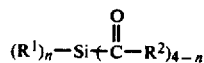

in which $R^1$ and $R^2$ each represent a substituted or unsubstituted alkyl group having from 1 to 10 carbon atoms or a substituted or unsubstituted aromatic group, and n represents an integer from 0 to 3, provided that a plurality of $R^1$ may be the same as or different from one another when n is 2 or 3, and a plurality of $R^2$ may be the same as or different from one another when n is 0, 1 or 2. The alkyl group having from 1 to 10 carbon atoms may, for example, be methyl, ethyl, propyl, butyl, pentyl, hexyl, octyl, and the like. The aromatic group may, for example, be phenyl, naphthyl, anthranil and the like. Examples of the substituents for these alkyl and aromatic groups include nitro, cyano, methoxy and the like.

The following may be cited as concrete examples of the α-ketosilyl compounds:

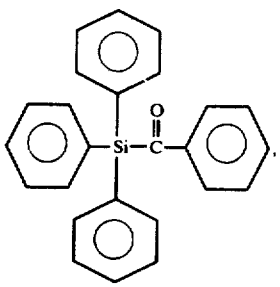

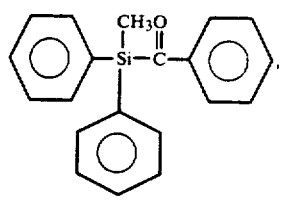

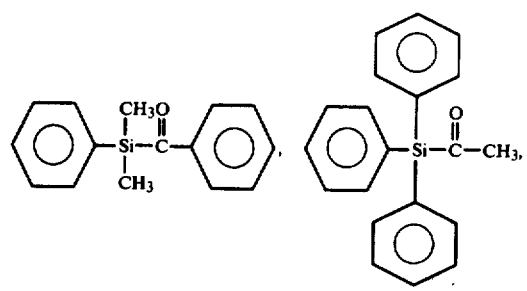

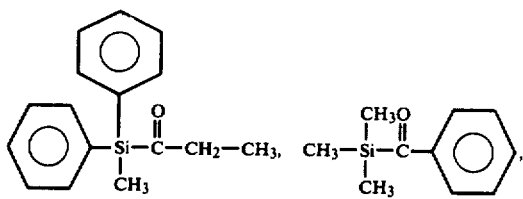

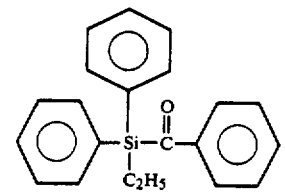

These α-ketosilyl compounds are generally used in an amount of 0.1 to 10% by weight, preferably 1 to 5% by weight, based on the epoxy compounds.

An amount of α-ketosilyl compounds below 0.1% by weight cannot give sufficient curing characteristics, on the contrary an amount thereof in excess of 10% by weight can also be used, but would make the compositions expensive and would present a problem concerning decomposition products of the catalyst components.

Active proton-containing compounds may additionally be added to the epoxy resin compositions according to the present invention, and these compounds can increase a catalytic activity. The active proton-containing compounds include water, alcohols, thiols and the like, which may independently or mixedly be used. Particularly, it is preferred that they are alcohols containing from 1 to about 6 carbon atoms such as, e.g., methyl alcohol, ethyl alcohol, propyl alcohol, and thiols containing from 1 to about 5 carbon atoms such as, e.g., methane thiol, ethane thiol and propane thiol. These active proton-containing compounds may be used in an amount of 0.01 to 10% by weight, preferably 1 to 7% by weight, based on the epoxy resins. These compounds are taken into the catalyst components by the photoreaction and, therefore, do not adversely affect the characteristics of the photo-cured products.

The photo-curable compositions of the present invention can be cured by methods such as cold photo-curing, high-temperature photo-curing, after-cure which is effected after the photo-curing. The wavelength of light necessary for the photo-curing will generally be from 180 nm to 600 nm, depending on the resin compositions, and high-pressure mercury-vapor lamps, carbon-arc lamps, xenon lamps, argon glow discharge tubes and the like may be used as the light source.

The present invention will further be illustrated below in accordance with the following nonlimitative examples.

EXAMPLE 1

Into a pyrex polymerization tube were introduced 2 ml of cyclohexene oxide, 0.036 g of triphenylsilyl phenyl ketone, 0.008 g of tris(normal-propylacetoacetate) aluminum and 0.002 g of water. When exposed at 40° C. to a high-pressure mercury-vapor lamp (400 W) for 20 hours, the system hardened to give polycyclohexene oxide in a yield of about 100%.

COMPARATIVE EXAMPLE 1

Into a pyrex polymerization tube were introduced 2 ml of cyclohexene oxide, 0.04 g of triphenylsilyl phenyl ketone and 0.002 g of water. The system was exposed at 40° C. to a high-pressure mercury-vapor lamp (400 W) for 20 hours. However, no polymer was obtained. On the other hand, the same composition as used in Example 1 was allowed to react without irradiating any ultraviolet rays thereupon, whereupon no polymer was obtained.

EXAMPLE 2

Into a pyrex polymerization tube were introduced 10 g of an epoxy resin (Chisson Nox 206 available from Chisso Corporation, Japan), 0.50 g of diphenylmethylsilyl phenyl ketone, 0.20 g of tris(ethylacetoacetato) aluminum, and 0.05 g of water. When exposed at 50° C. to a high-pressure mercury-vapor lamp (400 W) for 20 hours, the system gave a satisfactory cured product.

EXAMPLE 3

A mixture was prepared from 100 g of an epoxy resin (Chisso Nox 221 available from Chisso Corporation, Japan), 2 g of triphenylsilyl phenyl ketone, 0.9 g of tris(acetylacetonato)aluminum, 0.5 g of water and 1.5 g of ethyl alcohol. The mixture was then introduced into the space between silica glass plates which were spaced apart by use of a 1 mm spacer. When exposed at 60° C. to ultraviolet rays emitted from a mercury vapor lamp (400 W) for 15 hours, the system yielded a satisfactory cured product. Measurement of the electric characteristics of the cured resin plate indicated that a tan δ value thereof was 3.5% at 130° C. When after-cured at 100° C. for 5 hours, the cured resin plate showed a tan δ value of 5.6% at 180° C.

COMPARATIVE EXAMPLE 2

In 100 g of Chisso Nox 221 (available from Chisso Corporation, Japan), was dissolved 2 g of BF₃ monoethylamine. The solution was hardened to prepare a 1 mm-thick cured resin plate. The tan δ value of this cured resin plate could not be measured at 180° C.

EXAMPLE 4

A mixture was prepared from 100 g of an epoxy resin (Epikote 828 available from Shell Kagaku Kabushiki Kaisha, Japan), 100 g of another epoxy resin (Epikote 152 available from Shell Kagaku Kabushiki Kaisha, Japan), 4 g of diphenylvinylsilyl phenyl ketone, 2 g of tris(normal-butylacetoacetato)aluminum, 1 g of water, and 2 g of propyl alcohol. The mixture was introduced into the space between silica glass plates which were spaced apart by use of a 1 mm spacer. The mixture gelled when exposed at 60° C. to ultraviolet rays from a high-pressure mercury-vapor lamp for 15 hours. The gelled mixture was then after-cured at 100° C. for 5 hours to yield a satisfactory cured resin plate. Measurement of the electric characteristics of the obtained resin plate indicated that the tan δ value was 7.2% at 180° C.

EXAMPLE 5

A mixture was prepared from 50 g of an epoxy resin (Epikote 807 available from Shell Kagaku Kabushiki Kaisha, Japan), 30 g of another epoxy resin (Epikote 828 available from Shell Kagaku Kabushiki Kaisha, Japan), 20 g of another epoxy resin (Epikote 1001 available from Shell Kagaku Kabushiki Kaisha, Japan), 60 g of an acid anhydride (Epichlon B570 available from Dainippon Ink And Chemicals, Incorporated, Japan), 4 b of triphenylsilyl phenyl ketone, 3 g of ethyl alcohol, and 3 g of tris(isobutylacetoacetato)aluminum. The mixture was introduced into the space between silica glass plates which were spaced apart by use of a 1 mm spacer. The mixture gelled when exposed at 60° C. to ultraviolet rays from a high-pressure mercury-vapor lamp for 10 hours. The gelled mixture was then after-cured at 130° C. for 5 hours to yield a satisfactory cured resin plate. Measurement of the electric characteristics of the obtained resin plate indicated a tan δ value of 5.1% at 180° C.

EXAMPLE 6

A mixture was prepared from 70 parts by weight of an epoxy resin (Chisso Nox 221), 15 parts by weight of Epikote 828, and 20 parts by weight of the following acrylic acid ester:

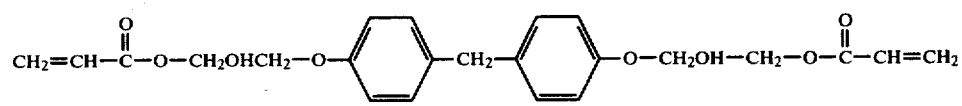

The resulting mixture was then mixed with 3 parts by weight of diphenyldibenzoylsilane, 2 parts by weight of isopropyl alcohol, and 3 parts by weight of trissalicylaldehydatoaluminum. Then, the obtained mixture was applied onto a copper plate. When exposed to a 1 kW high-pressure mercury-vapor lamp at a distance of 10 cm for 5 hours, the system gave a satisfactory insulating film.

EXAMPLE 7

Onto a copper plate was applied a mixture which was prepared by mixing 40 parts by weight of an epoxy resin (Chisso Nox 221), 30 parts by weight of a cresol novolak type epoxy resin, 15 parts by weight of the following imide compound:

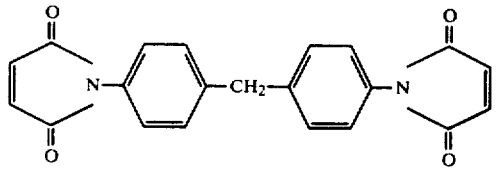

4 parts by weight of diphenyldibenzoylsilane, 3 parts by weight of isopropyl alcohol, and 3 parts by weight of trisethylacetoacetatoaluminum. When exposed to a 1 kW high-pressure mercury-vapor lamp at a distance of 10 cm for 5 hours, the system yielded a satisfactory film.

As is clear from the above Examples, the compositions of the present invention quickly harden when exposed to light and give cured products which show extremely excellent electric characteristics such as a tan δ value. The compositions of the present invention are suitable for electrical uses in electrical applications, for example, as resist materials and insulating materials in electric equipment, particularly as coil insulators.

We claim:

1. A photo-curable epoxy resin composition comprising:
    an epoxy resin; and
    a catalytic component comprising:
        an organic aluminum compound, and
        an alpha-ketosilyl compound, whereby the composition is curable upon exposure to light to produce a cured product free from ionic impurities.

2. A photo-curable epoxy resin composition as defined in claim 1, wherein said organic aluminum compound is selected from the group consisting of alkoxyaluminum, aryloxyaluminum, acyloxyaluminum, and aluminum chelate compounds.

3. A photo-curable epoxy resin composition as defined in claim 1, wherein said aluminum compound is used in an amount of 0.001 to 10% by weight based on the epoxy resin.

4. A photo-curable epoxy resin composition as defined in claim 3, wherein said aluminum compound is used in an amount of 0.5 to 5% by weight based on the epoxy resin.

5. A photo-curable epoxy resin composition as defined in claim 1, wherein said α-ketosilyl compound has the following general formula:

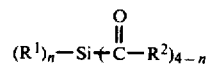

in which $R^1$ and $R^2$ each represent a substituted or unsubstituted alkyl group having from 1 to 10 carbon atoms, or a substituted or unsubstituted aromatic group, and n represents an integer from 0 to 3, provided that a plurality of $R^1$ may be the same as or different from one another when n is 2 or 3, and a plurality of $R^2$ may be the same as or different from one another when n is 0, 1 or 2.

6. A photo-curable epoxy resin composition as defined in claim 1, wherein said α-ketosilyl compound is used in an amount of 0.1 to 10% by weight based on the epoxy resin.

7. A photo-curable epoxy resin composition as defined in claim 6, wherein said α-ketosilyl compound is used in an amount of 1 to 5% by weight based on the epoxy resin.

8. A photo-curable epoxy resin composition as defined in any of claim 1, wherein said composition further contains an active proton-containing compound.

9. A photo-curable epoxy resin composition as defined in claim 8, wherein said active proton-containing compound is water, an alcohol or a thiol.

10. A photo-curable epoxy resin composition as defined in claim 8, wherein said active proton-containing compound is used in an amount of 0.01 to 10% by weight based on the epoxy resin.

11. A photo-curable epoxy resin composition as defined in claim 10, wherein said active proton-containing compound is used in an amount of 1 to 7% by weight based on the epoxy resin.

12. A photo-cured epoxy resin composition, comprising a photo-curable epoxy resin composition as defined by claim 1, which has been exposed to light for a period of time sufficient to cure said composition.

13. An article of manufacture suitable for use in electrical applications, comprising a base member and a layer of an electrically-insulating composition applied to said base member, wherein said insulating composition comprises a photo-cured epoxy resin composition as defined in claim 12.

* * * * *